US009177567B2

(12) United States Patent
Chu et al.

(10) Patent No.: US 9,177,567 B2
(45) Date of Patent: Nov. 3, 2015

(54) SELECTIVE VOICE TRANSMISSION DURING TELEPHONE CALLS

(71) Applicant: International Business Machines Corporation, Armonk, NY (US)

(72) Inventors: Jean Chu, Englewood Cliffs, NJ (US); Susan L. Diamond, Poughkeepsie, NY (US); William L. Fang, Astoria, NY (US); Peter B. Hom, Armonk, NY (US); Jenny S. Li, Danbury, CT (US); Jing-Na Yuan, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 29 days.

(21) Appl. No.: 14/055,945

(22) Filed: Oct. 17, 2013

(65) Prior Publication Data
US 2015/0111615 A1    Apr. 23, 2015

(51) Int. Cl.
*H04B 1/38* (2015.01)
*G10L 21/0208* (2013.01)
*H04M 3/493* (2006.01)
*H04M 3/22* (2006.01)
*G10L 17/00* (2013.01)

(52) U.S. Cl.
CPC ......... *G10L 21/0208* (2013.01); *H04M 3/2236* (2013.01); *H04M 3/4936* (2013.01); *G10L 17/00* (2013.01); *G10L 2021/02087* (2013.01)

(58) Field of Classification Search
CPC ............ H04M 1/271; H04M 1/72519; H04M 2250/74; H04M 3/56; H04M 3/566
USPC .................................................... 455/563, 416
See application file for complete search history.

(56) References Cited

U.S. PATENT DOCUMENTS

| | | | |
|---|---|---|---|
| 6,810,116 B1 | 10/2004 | Sorensen et al. | |
| 8,078,463 B2 | 12/2011 | Wasserblat et al. | |
| 2003/0097259 A1* | 5/2003 | Balan et al. | 704/226 |
| 2007/0188901 A1* | 8/2007 | Heckerman et al. | 360/23 |
| 2007/0206759 A1 | 9/2007 | Boyanovsky | |
| 2008/0181140 A1 | 7/2008 | Bangor et al. | |
| 2011/0102540 A1 | 5/2011 | Goyal et al. | |
| 2011/0246193 A1* | 10/2011 | Shin | 704/233 |
| 2012/0166188 A1 | 6/2012 | Chakra et al. | |
| 2013/0117059 A1* | 5/2013 | Norton et al. | 705/7.18 |
| 2014/0051383 A1* | 2/2014 | Doerr et al. | 455/405 |
| 2014/0105407 A1* | 4/2014 | Herger et al. | 381/57 |

* cited by examiner

*Primary Examiner* — Temica M Beamer
(74) *Attorney, Agent, or Firm* — Cantor Colburn LLP

(57) ABSTRACT

Embodiments of the disclosure relate to selective voice transmission and include receiving an identification of one or more authorized speakers for a telephone call and retrieving a voice sample for each of the one or more authorized speakers. Embodiments also include receiving one or more audio signals for the telephone call and filtering the one or more audio signals by removing a portion of the one or more audio signals that do not contain a voice of at least one of the one or more authorized speakers in the one or more audio signals.

7 Claims, 5 Drawing Sheets

SELECTIVE VOICE TRANSMISSION DURING TELEPHONE CALLS

BACKGROUND

The present disclosure relates to voice transmission, and more specifically, to selective voice transmission during telephone calls.

It is often difficult to achieve clear voice transmission when speaking over a telephone in a busy or noisy place, such as a crowded restaurant, a noisy street, a train station, an office cubicle, or the like. In many cases, background noises and neighboring conversations are picked up by a telephone microphone and transmitted on a telephone call. These background noises are undesirable and make it difficult for other individuals on a telephone call to clearly hear the voice of the person speaking on the call.

A variety of different technologies have been developed to attempt to filter out background noise during telephone calls. For example, current technologies include voice suppression, noise reduction and noise cancellation. In general, these technologies use a combination of algorithms and hardware, such as multiple microphones, to attempt to filter out the unwanted background noise. However, the currently available methods are not able to distinguish between neighboring conversations and the voice of a person using the phone.

SUMMARY

According to a further embodiment, a system for selective voice transmission having a processor configured to perform a method. The method includes receiving an identification of one or more authorized speakers for a telephone call and retrieving a voice sample for each of the one or more authorized speakers. The method also includes receiving one or more audio signals for the telephone call and filtering, by a processor, the one or more audio signals by removing a portion of the one or more audio signals that do not contain a voice of at least one of the one or more authorized speakers in the one or more audio signals.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for selective voice transmission are provided. In exemplary embodiments, a selective voice transmission system is configured to collect and store a voice sample of an authorized speaker and to use a voice recognition system to filter out sounds that do not correspond to the stored voice sample of the authorized speaker. In exemplary embodiments, the selective voice transmission system may be configured for use with a teleconference system. In other embodiments, the selective voice transmission may be configured for use on any telephone, such as a smartphone, for used during normal two-party telephone calls.

Figure 1:
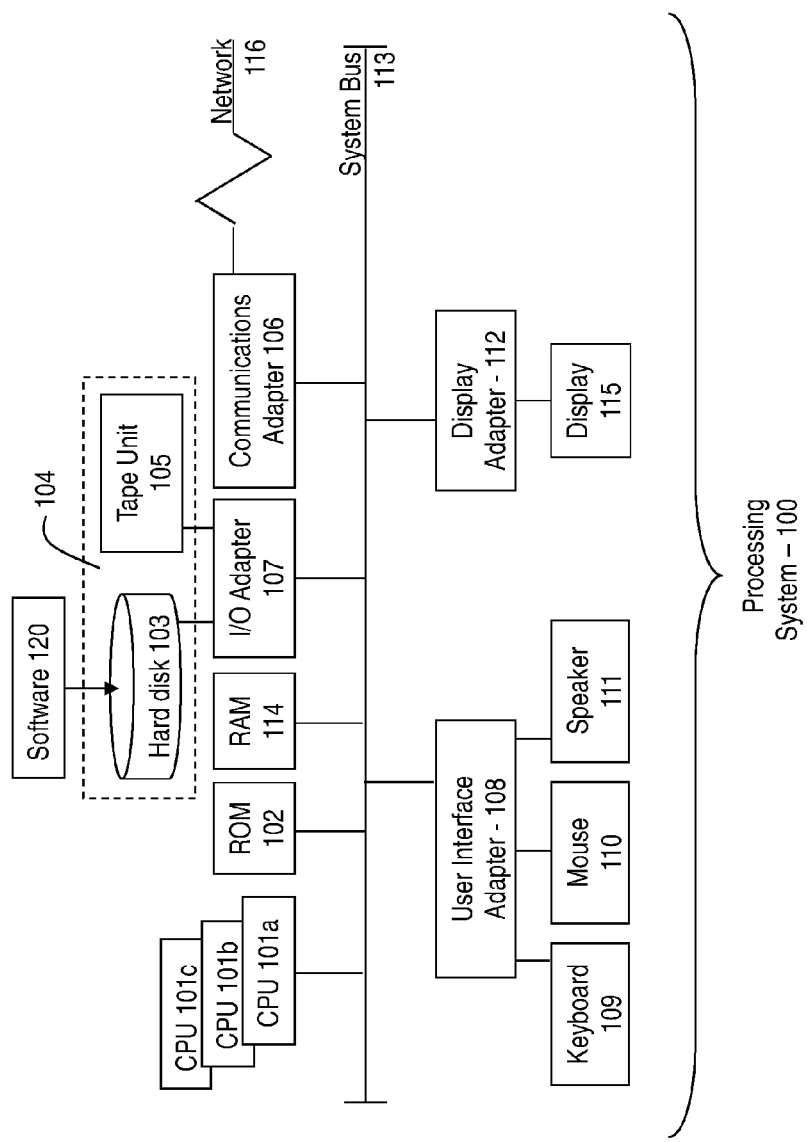
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
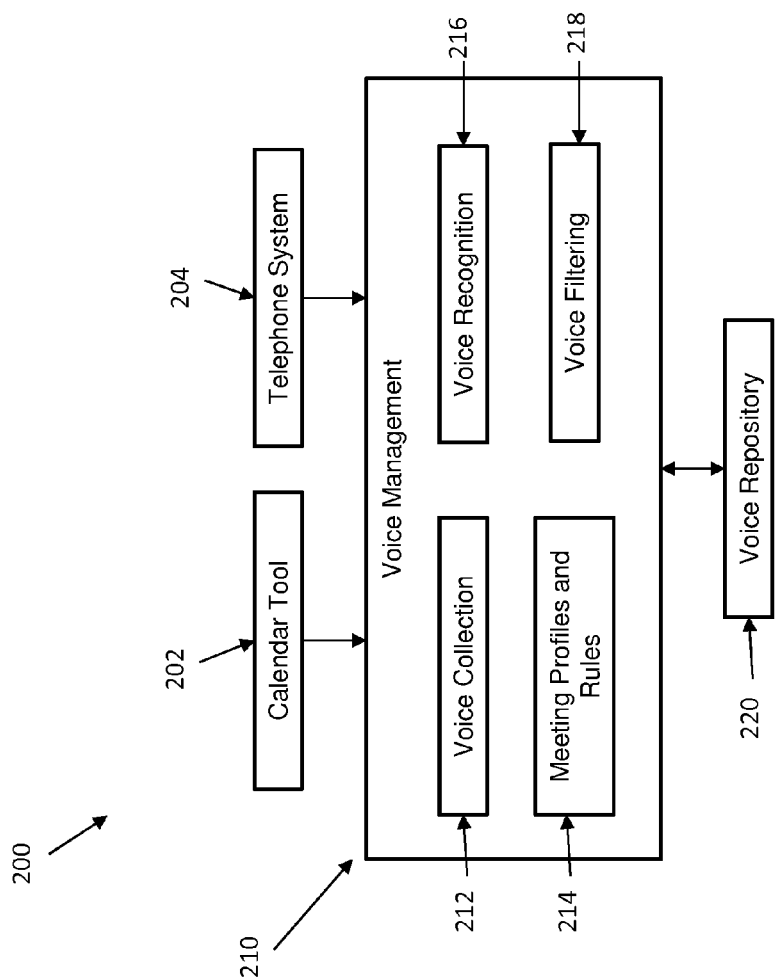
FIG. 2 is a block diagram illustrating a system for selective voice transmission in accordance with an exemplary embodiment.

Referring now to FIG. 2, a block diagram of a system 200 for selective voice transmission is shown. As illustrated the system 200 includes a voice management system 210 configured to communicate with a calendar tool 202 and a telephone system 204. In exemplary embodiments, the voice management system 210 is configured to receive input from the calendar tool 202 for setting up a conference call on the telephone system 204. In addition, the voice management system 210 is configured to interface with telephone system 204 during the conference call. In exemplary embodiments, the telephone system 204 may include both land lines and cellular telephone systems.

In exemplary embodiments, the calendar tool 202 is configured to allow a user to create a meeting, or conference call. The calendar tool 202 allows a user to invite participants to join a conference call and to specify which participants of the conference call are authorized to speak during the conference call. In exemplary embodiments, the calendar tool 202 may also be configured to allow a meeting creator to set specific time periods that each participant is permitted to speak during the conference call.

In exemplary embodiments, the voice management system 210 includes a voice collection module 212, a meeting profiles and rules module 214, a voice recognition module 216 and a voice filtering module 218. In exemplary embodiments, the voice collection module 212 is configured to collect voice samples of the participants of a call that are authorized to speak during the conference call. In one embodiment, once the authorized speakers are identified for a conference call, the voice collection module 212 accesses a voice repository 220 to retrieve voice samples for the authorized speakers. If the voice repository 220 does not include a voice sample for each of the authorized speakers, the voice collection module 212 will request voice samples from the authorized speakers prior to or at the beginning of the conference call. In exemplary embodiments, the voice repository 220 is a database that stores voice samples.

In exemplary embodiments, the meeting profiles and rules module 214 is configured to store information received from the calendar tool 202 for each conference call. The stored information includes information regarding the meeting participants and authorized speakers. In exemplary embodiments, the meeting profiles and rules module 214 may also store additional information regarding each of the participants of the conference call, such as their contact information.

In exemplary embodiments, the voice recognition module 216 is configured to analyze the voices, and other noises, present on the conference call. The module 216 first checks if a voice sample for each of the authorized speakers exists in the voice repository or not. If it does, the module 216 compares the incoming voice with the sample to see if it is an exact voice match or the incoming voice contains the voice of the authorized user. If either case is true, the incoming voice is validated with the authorized users list. Voice filtering module 218 filters out any non-matching voice or noise from the background. Sound and voice filtration systems of this type are described in commonly owned U.S. patent application Ser. No. 12/979,531, filed Dec. 28, 2010, and published Jun. 28, 2012 as U.S. Patent Application Publication 2012/0166188; the specifications of such application and publication are incorporated herein by reference. In the case when multiple voices are coming through a single phone line, the voice recognition module 216 checks the amplitude (loudness), frequency (pitch) and rate of speaking of multiple voices to determine whether an authorized user's voice is part of the sound. For example, an authorized speaker may be in the same conference room with other participants. The authorized speaker usually is given a microphone or sits close to a microphone. Therefore, the authorized speaker's voice should be the loudest in the room compared to other participants who may have chats on the side. The voice recognition module 216 can also identify the authorized speaker by the rate of speaking such as the number of words per minute or number of words per breath. In addition, the fundamental frequency range for human speech (75-150 Hz for men and 150-300 Hz for women) can be analyzed to differentiate a man's or a woman's voice, or background noise. Once an authorized speaker's voice is identified among other non-authorized speakers' voices, the voice filtering module 218 isolates the voice of the authorized speaker and filters out non-matching voice or noise. Then it returns only the authorized speaker's voice. In one embodiment, during a conference call, the telephone system 204 may send information regarding who has called in to the conference call to the voice recognition module 216. If the voice samples of the authorized speakers are not available when the conference call begins, the voice collection module 212 creates a voice sample of an authorized speaker when he or she calls in to the meeting and announces himself/herself.

In one embodiment, the voice management system 210 will provide feedback to the telephone system 204 on which participant's phone(s) to mute based on the meeting profiles and rules 214. For example, the voice management system 210 may determine that the participants that called in from a particular phone line may not be authorized to speak during a portion of a conference call and may instruct the telephone system 204 to mute that phone line during that portion of the conference call.

In another embodiment, the telephone system 202 may transmit all of the voices, and other sounds, present on each participant's phone to the voice recognition module 216. The voice recognition module 216 analyses the audio signals in real time and determines if the audio signals include the voice of an authorized speaker. The voice filtering module 218 then receives input from the voice recognition module 216 and responsively controls what voice(s) will be heard on the conference call by filtering out all sounds except the voice of the authorized speaker(s).

In exemplary embodiments, the voice transmission system is configured to select voices of the authorized speakers to be transmitted in a teleconference call. For example, if an authorized speaker calls into a conference call from a train station which is very noisy. Only the voice of the authorized speaker is heard as his voice has been identified as the authorized speaker while background noises at the train station, such as crying babies, train announcements, etc. would not be transmitted over the conference call.

In exemplary embodiments, when a conference call is scheduled, the conference chair sets the meeting profile and rules. The meeting profile and rules identify the authorized speakers and optionally an authorized time period for each authorized speaker. In addition, the meeting profile and rules may specify if other participants are permitted and if so for how long the other participants can speak per request. In exemplary embodiments, such other participants, referred to as exception speakers, have option to request an exception time to speak from the meeting chair during the conference call. Once the exception request is granted, an exception speaker's voice can be heard for the duration that is defined in the predefined rule.

Figure 3:
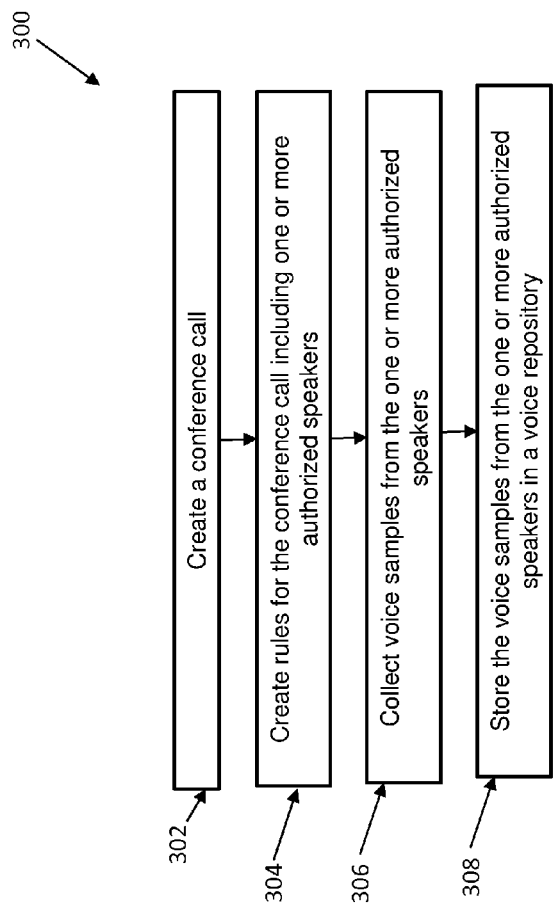
FIG. 3 is a flow diagram illustrating a method for setting up a conference call having selective voice transmission in accordance with an exemplary embodiment.

Referring now to FIG. 3, a flow chart illustrating a method 300 for setting up a conference call having selective voice transmission in accordance with an exemplary embodiment is shown. As shown at block 302, the method 300 includes creating a conference call. In exemplary embodiments, the conference call is created by a meeting organizer using an existing calendar tool. Next, as shown at block 304, the method 300 includes creating rules for the conference call including one or more authorized speakers. As shown at block 306, the method 300 also includes collecting voice samples from the one or more authorized speakers. Next, as shown at block 308, the method 300 also includes storing the voice samples from the one or more authorized speakers in a voice repository.

Figure 4:
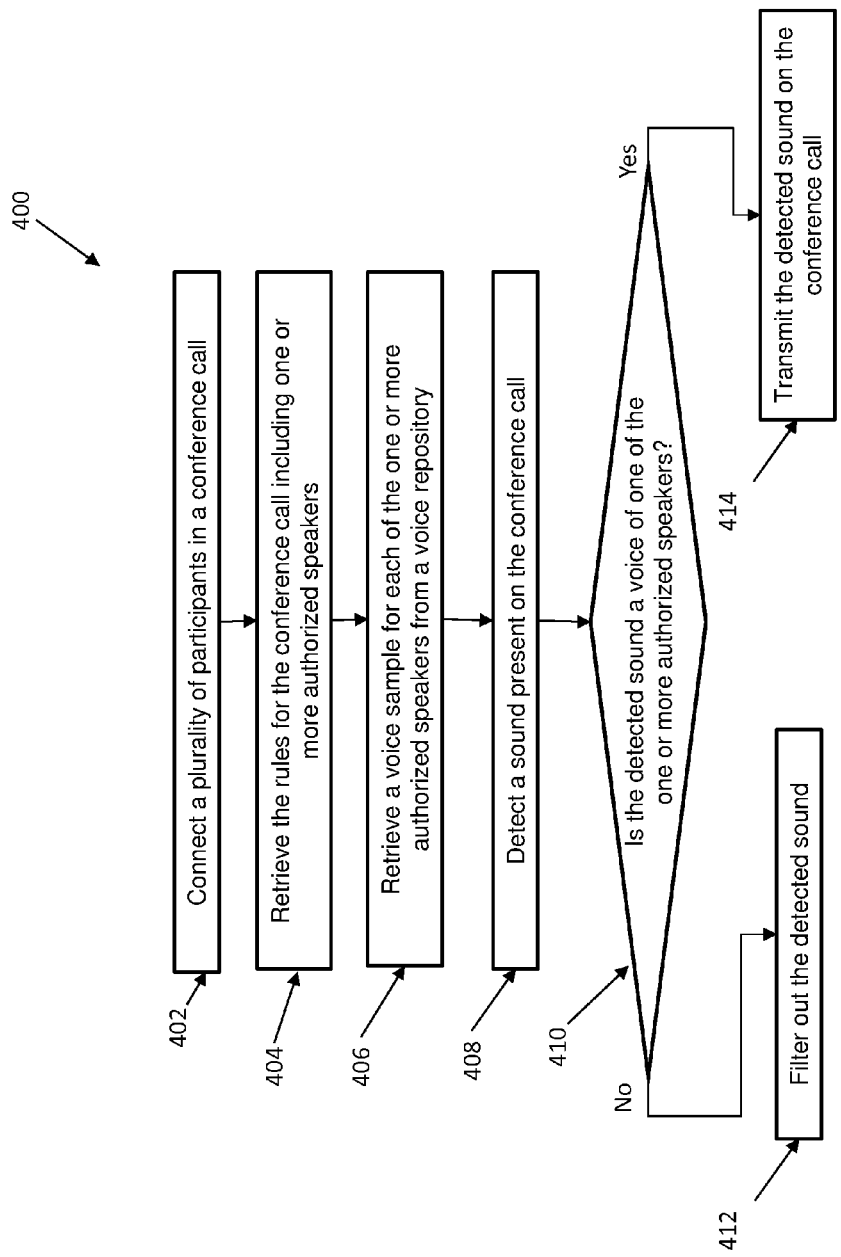
FIG. 4 is a flow diagram illustrating a method for administrating a conference call having selective voice transmission in accordance with an exemplary embodiment.

Referring now to FIG. 4, a flow chart illustrating a method 400 for administrating a conference call having selective voice transmission in accordance with an exemplary embodiment is shown. As shown at block 402, the method 400 includes connecting a plurality of participants to a conference call. Next, as shown at block 402, the method 400 includes retrieving the rules for the conference call including one or more authorized speakers. As shown at block 406, the method 400 also includes retrieving a voice sample for each of the one or more authorized speakers from a voice repository. Next, as shown at block 408, the method 400 includes detecting a sound present on the conference call. As shown at decision block 410, the method 400 includes determining if the detected sound is a voice of one of the one or more authorized speakers. If the detected sound is a voice of one of the one or more authorized speakers, the method proceeds to block 414 and transmits the detected sound on the conference call. Otherwise, the method 400 proceeds to block 412 and filters out the detected sound.

In one example of the selective voice transmission system, Jenny schedules a conference call using a calendar tool for Dec. 1, 2013 from 1:00 pm to 2:00 pm. Jenny adds Jean, Peter, and 40 other people to the conference call. Jenny marks Jean and Peter as authorized speakers from 1:00 to 1:45 pm. The calendar tool notifies the voice management tool to collect Jean's and Peter's voice samples prior to the conference call. Assuming that the voice management tool finds Peter's voice sample in the voice repository but not Jean's voice sample, the voice management tool sends an email to Jean to collect her voice sample. Jean then records her voice sample as instructed by the voice management tool and it is stored in the voice repository.

At the time of the conference call, each participant calls into the meeting. Optionally, each person announces themselves when joining the conference call. Assume that Jean is calling from an airport, which is very noisy, and that Peter is calling in from home. The voice management tool only allows the voice of Jean, Peter and the meeting chair to be heard for the first 45 minutes. When Jean speaks, the voice recognition only picks up her voice and does not allow any other voices to be heard because she is identified as the authorized speaker. Even though there are very loud background announcements at the airport, those voices do not match her voice sample in the voice repository, and so they are not being transmitted over the conference call line. Since Jenny has set up the meeting to have Jean and Peter present for the first 45 minutes, other participants' voices can only be heard in the last 15 minutes of the meeting.

In exemplary embodiments, if the meeting chair does not specify who the authorized speakers are, the voice management system 210 may be configured to assume that everyone who calls into the meeting can have their voices transmitted over the conference call line. In this case, the voice collection component 212 can use the first few seconds to record each participant's voice sample when they call into the meeting and announce their presence at the beginning of the call. These voice samples will then be stored and these will be the voices that can be transmitted, all other voices that do not match will not be heard.

Figure 5:
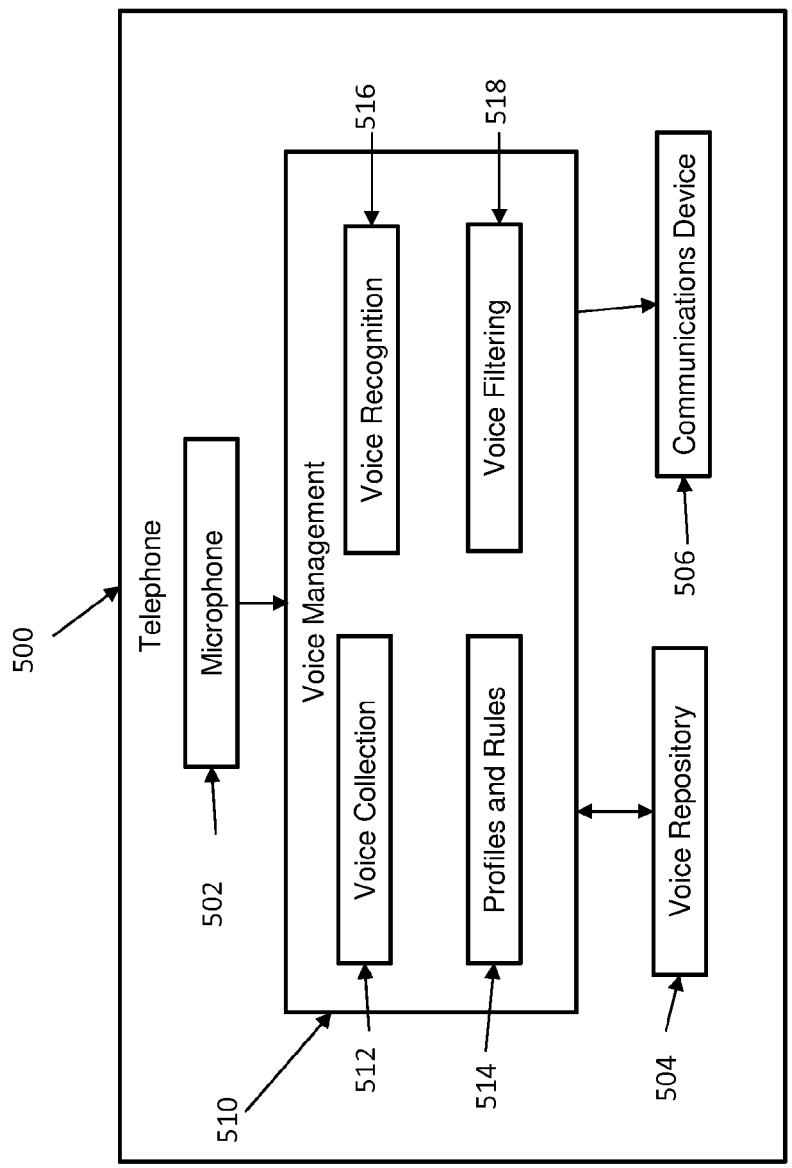
FIG. 5 is a block diagram illustrating a telephone configured for selective voice transmission in accordance with an exemplary embodiment.

Referring now to FIG. 5, a block diagram of a telephone 500 configured for selective voice transmission in accordance with an exemplary embodiment is shown. As illustrated, the telephone 500 includes a microphone 502, a voice repository 504, a communications device 506 and a voice management system 510. In exemplary embodiments, the telephone 500 may be a cellular phone and the communications device 506 may be a suitable cellular radio.

In exemplary embodiments, the owner or user of the telephone 500 may configure the telephone 500 to enable selective voice transmission via the voice management system 510. The voice management system 510 includes a voice collection module 512, a profiles and rules module 514, a voice recognition module 516 and a voice filtering module 518. The voice collection module 512 is configured to collect and store a voice sample from each user of the telephone 500. The profiles and rules module 514 is configured to allow a user to select times and places in which the user wants to utilize the voice management system 510 and to select one or more configuration options for the use of the voice management system 510. The voice recognition module 516 is configured to compare the voices and noises picked up from the microphone 502 and to identify the presence of any voices that match voices stored in the voice repository 504. The voice filtering module 518 is configured to filter out all noises except the voices identified by the voice recognition module 516.

In exemplary embodiments, one or more users of a telephone 500 may use the voice management system 510 to record and store a sample of their voice in the voice repository 504. When a user of the telephone 500 wants to make a call the user may need to either enable or disable the voice management system 510. When the voice management system 510 is enabled, the voice management system 510 receives the output of the microphone 502 and filters out all of the noise and voices picked up by the microphone 502 other than the voice of the user. The voice management system 510 then transmits the filtered voice signal to the communications device 506.

In exemplary embodiments, the voice management system is configured to support exception handling. In one embodiment, only voices of authorized speakers are selected to be transmitted. However, if other participants request to have their voice being heard, the exception handling will grant the other participants the right to have their voice transmitted as well (e.g., each participant can be granted maximum of two minutes talk time etc)

In one embodiment, if the meeting organizer does not specify who the key speakers are, the voice management system is configured to treat every meeting participant who calls into the meeting as an authorized speaker. For example, the voice collection component can use the first few seconds to record a voice sample from each participant when he or she calls into the meeting at the beginning. These voice samples can then be used to filter out the voices that can be transmitted. All other voices that don't match the recorded voice samples will not be heard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for selective voice transmission having a processor configured to perform a method, the method comprising:

receiving an identification of one or more authorized speakers for a telephone call;
   retrieving a voice sample for each of the one or more authorized speakers;
   receiving one or more audio signals for the telephone call; and
   filtering the one or more audio signals by removing a portion of the one or more audio signals that do not contain a voice of at least one of the one or more authorized speakers in the one or more audio signals.

2. The system of claim 1, wherein retrieving a voice sample for each of the one or more authorized speakers further comprises retrieving the voice sample from a voice repository.

3. The system of claim 1, wherein retrieving a voice sample for each of the one or more authorized speakers further comprises collecting the voice sample from the one or more authorized speakers.

4. The system of claim 3, wherein collecting the voice sample from the one or more authorized speakers occurs during a portion of the telephone call.

5. The system of claim 1, wherein the identification of one or more authorized speakers includes an identity of each of the one or more authorized speakers and an authorized time period for each of the one or more authorized speakers.

6. The system of claim 5, wherein the filtering further comprises removing the portion of the one or more audio signals that contains the voice of one of the authorized speaker in the one or more audio signals if a current time is not within the authorized time period corresponding to the authorized speaker.

7. The system of claim 5, wherein the voice of at least one of the one or more authorized speakers are identified by a voice frequency, amplitude and a rate of speaking of the one or more authorized speakers.

* * * * *